United States Patent Office 3,344,983
Patented Oct. 3, 1967

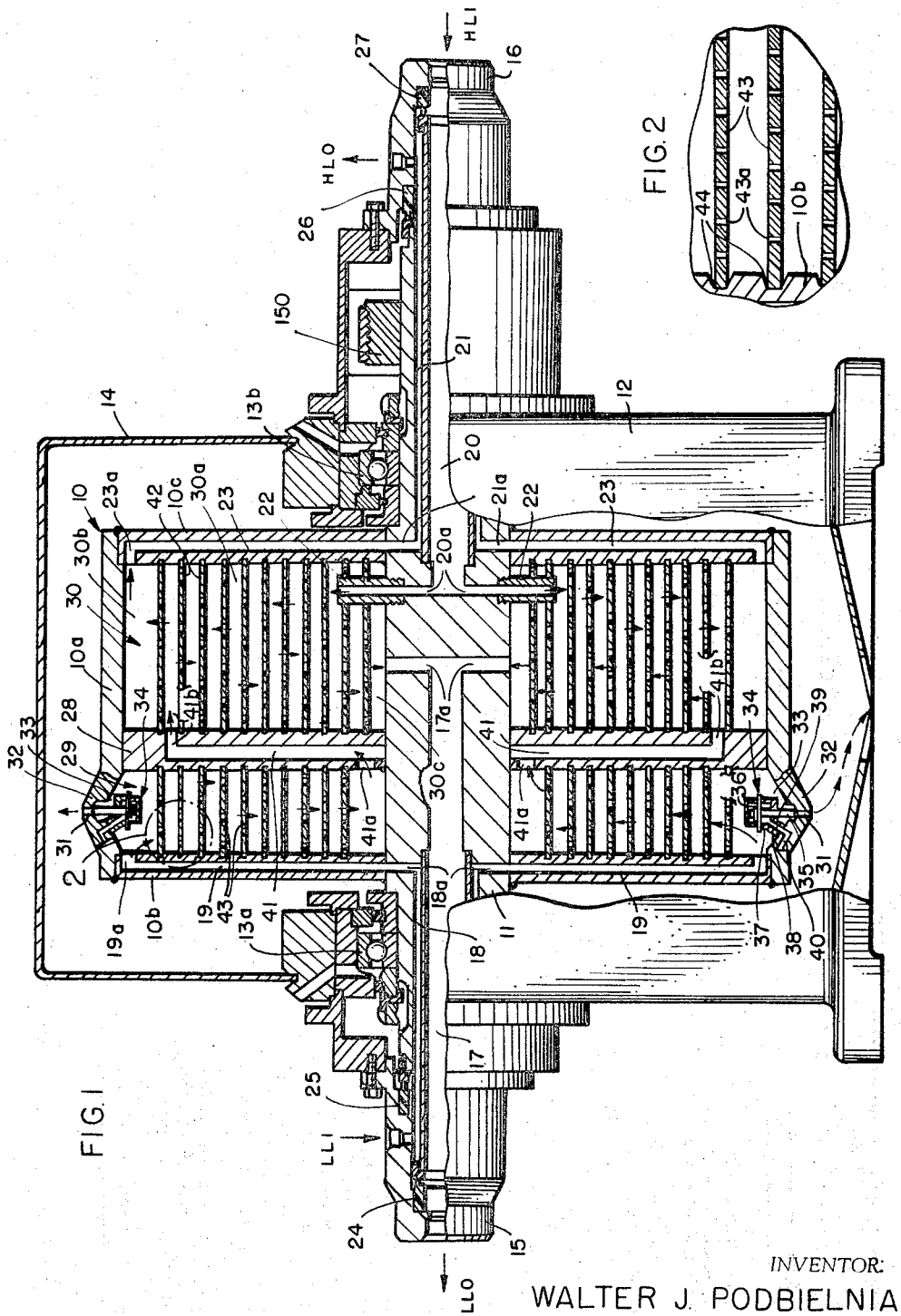

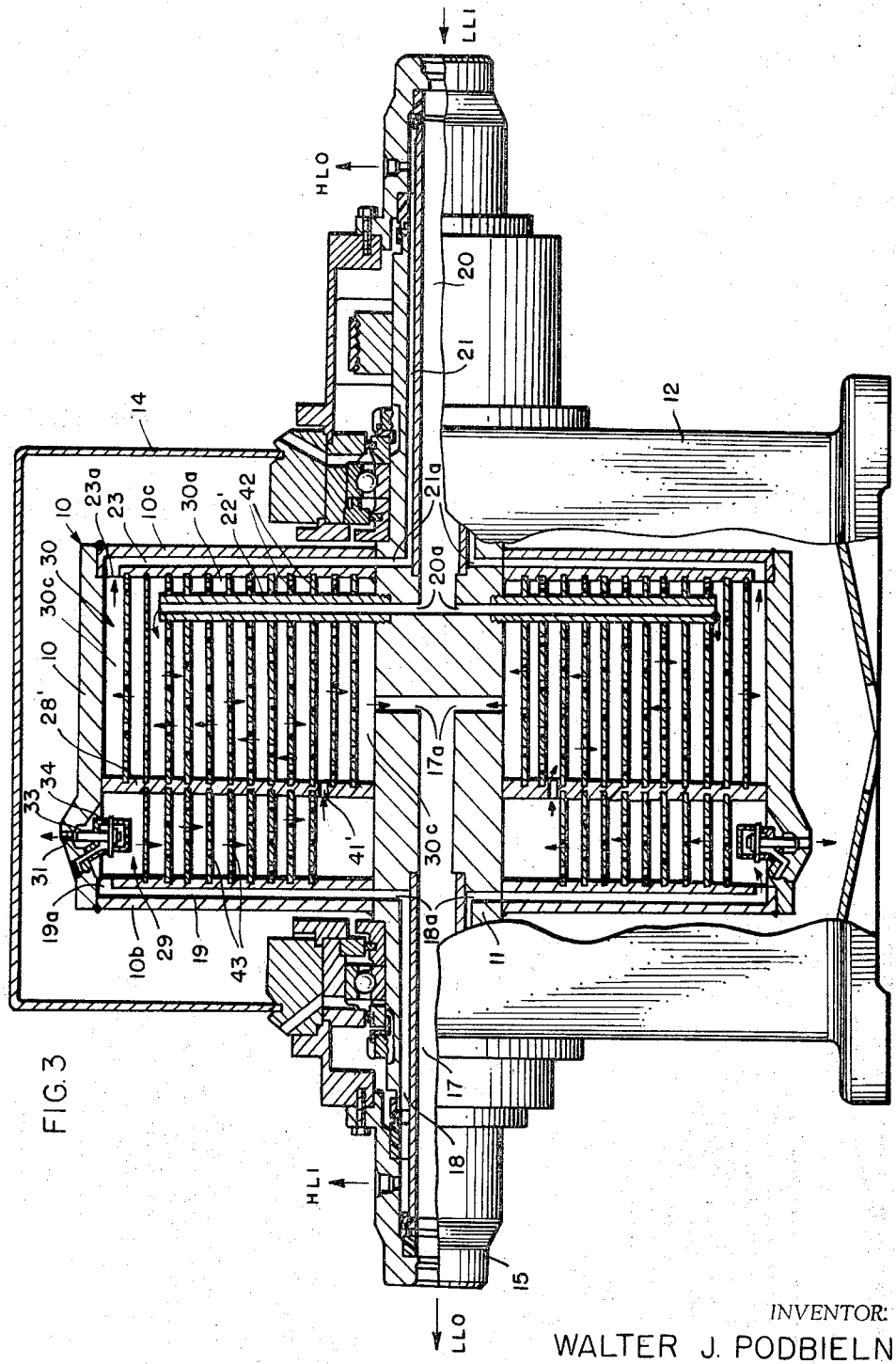

3,344,983
COMBINATION CLARIFIER AND CONTACTOR
Walter J. Podbielniak, Chicago, Ill., assignor to Dresser Industries, Inc., Dallas, Tex., a corporation of Delaware
Filed Feb. 8, 1965, Ser. No. 430,926
8 Claims. (Cl. 233—15)

ABSTRACT OF THE DISCLOSURE

Apparatus for countercurrent contacting of two liquid phases after first removing solids from one of the liquid phases. The apparatus includes a rotor in the form of generally cylindrical form defined by a shaft, parallel end walls and an intermediate partition secured to said shaft, and a closing peripheral wall, defining two side-by-side chambers. The first working chamber is the solids removable chamber and may include passages for introducing a solid containing light phase at the outer periphery of this first chamber, the solids then collecting at the outer periphery and the light phase flowing toward the inner periphery. Solids discharge valves are provided at the outer periphery for removing the solids material at suitable intervals. The partition provides means for conveying the clarified light phase from the inner periphery of the first chamber to the outer periphery of the second chamber for countercurrent contacting with the heavy phase which is introduced at the innter periphery of the second chamber. The light phase is then removed from the inner periphery of the first chamber while the heavy phase is removed from the outer periphery thereof. Where the heavy phase includes the solids which are to be removed, this phase is introduced to the first chamber adjacent the outer periphery thereof; and this clarified phase is passed directly through passages in the partition adjacent to the inner periphery thereof, whereby the heavy phase passes to the inner periphery of the second chamber for countercurrent contacting with the light phase which is introduced adjacent to the outer periphery of the second chamber. Thus, a single apparatus is provided for initial solids removal from one or the other of two phases, which is then passed in countercurrent contacting relation with each other.

---

This invention relates to a combination clarifier and contactor. More particularly, the invention is concerned with a centrifugal apparatus for the countercurrent contacting of substantially immiscible liquid phases of different density, as in an extraction operation, where one of the liquid phases contains solid material which is desirably removed prior to the contacting or extraction.

Centrifugal countercurrent contacting apparatus having solids handling capacity have been known and used commercially for many years. Apparatuses of this type are described in Patents 2,652,975 and 2,758,784. With such apparatuses, the solids are removed with the heavy phase. Consequently, it is impossible to obtain a fully clarified or solids-free heavy phase. Where the heavy liquid supplied to the rotor contains solid material, the solids will tend to flow through the rotor with the heavy phase, thereby exposing substantially the whole rotor, including particularly the countercurrent contacting zone, to contamination and plugging due to the accumulation of solids therein. Since it is common to employ contacting elements in the form of cylinders having a multiplicity of small perforations, the problem of solids accumulation and plugging can be very serious, especially where the heavy liquid contains a relatively large proportion of solids which tend to move with difficulty through small perforations. It has, therefore, been necessary to equip the rotors of the apparatus with clean-out means, such as the one described in Patent 2,652,975.

Where the solids are contained in the light phase supplied to the rotor, the problem of solids accumulation and plugging may be somewhat less severe, but it cannot be eliminated entirely. The light phase is supplied to the outer portion of the rotor, and the solids suspended therein, usually being heavier than the light phase, will tend to be thrown outwardly and separated from the light phase. As the solids separate from the light phase, they will move outwardly with the heavy phase in the heavy phase clarifying zone, and will be discharged with the heavy phase. As previously pointed out, this causes the heavy phase to be contaminated with the solids and also exposes the heavy phase clarifying zone to contamination and plugging. If the heavy phase is to be reused, it will then be necessary to remove the solids by some separate processing operation, such as settling, centrifugation, etc.

One of the further disadvantages of conducting the contacting and extracting operations with solids in either the light or heavy phase is that it is frequently necessary to shut the operation down at intervals to flush out the rotor to remove accumulated solid material. This can lead to a loss of processing time. Another disadvantage which has not been heretofore overcome is that the presence of the solids in the rotor, particularly in the contacting zone thereof, may interfere with the desired extraction or other contacting operation. When this situation occurs, it has been found necessary to subject the light or heavy phase to preliminary treatment to remove the solid material therefrom before the phases are supplied to the centrifugal contacting apparatus.

It is, therefore, an object of the present invention to provide a centrifugal apparatus of the kind described which embodies an improved and modified construction and combination of elements which substantially overcomes the problems and difficulties described above. More specifically, it is an object to provide a centrifugal countercurrent contacting apparatus which incorporates means for removing suspended solid material from either the heavy phase or the light phase prior to the contacting of the phases. A further related object is to provide a centrifugal contacting apparatus which permits solids-containing liquids to be fed to the rotor of the apparatus without the removal of the solids therefrom, and which at the same time operates to exclude the solids from the contacting chamber of the rotor, and provides means for the separate removal or ejection of the solids, the apparatus thereby producing fully clarified light and heavy phases. Further objects and advantages will be indicated in the following detailed specification.

This invention is shown in illustrative embodiments in the accompanying drawings, in which FIGURE 1 is a front elevational view of a centrifugal apparatus embodying design features of the present invention, the apparatus being shown partly in section;

FIGURE 2 is an enlarged sectional detail view of a portion of the apparatus of FIG. 1; and FIGURE 3 is a front elevational view, partly in section, of a modified form of the apparatus of FIG. 1.

The apparatus of FIGURE 1 is particularly designed for a contacting operation where the light phase contains suspended solid material which it is desired to remove prior to the contacting operation. However, the apparatus of FIG. 1 may be taken as illustrative of the general design features of apparatus constructed in accordance with the present invention.

As shown in FIGURE 1, the apparatus includes a rotor casing 10 which is mounted coaxially on a shaft 11 and provides a radially-extending working space therein. In the illustration given, shaft 11 extends horizontally, and casing 10 is of cylindrical configuration, being formed of a cylindrical outer band or wall 10a and end plates 10b and 10c. The end plates 10b and 10c are received within recesses in the outer ends of band 10a and are welded thereto as well as to the shaft 11, which, in the illustration given, extends through the inner portion of the rotor working space. It will be understood that this provides a sealed casing around the working space.

Shaft 11 is rotatively mounted on a base 12 by means of suitable bearings 13a, 13b. An outer enclosure or shell 14 extends around the upper portion of the rotor 10, and is adapted for ready removal to permit access to the rotor.

As is well known in the art, means is provided for driving the shaft 11 at controlled rotational speeds, such as the driven sheave 150. Conduits are connected to stationary shaft extensions 15, 16 for the introduction and removal of liquids through passages in the shaft. In the illustration given, the left-hand portion of shaft 11 and the corresponding shaft extension 15 are provided with a central passage 17, and a surrounding annular passage 18. In the operational set-up of FIGURE 1, central passage 17 is employed for removal of the light phase, while annular passage 18 is employed for supplying the solids-containing light phase. The shaft passage 17 connects with branch passages 17a, while shaft passage 18 connects with branch passages 18a. Branch passage 18a in turn connects with passages 19 in end plate 10b.

Similarly, the right-hand portion of shaft 11 and the corresponding shaft extension 16 are provided with a central passage 20 and with a surrounding annular passage 21. Inner passage 20 communicates with branch passages 20a, which in turn connect with nozzles 22. Annular passage 21 communicates with branch passages 21a, which in turn communicate with passages 23 in end plate 10c. In the operational set-up of FIGURE 1, passage 20 is employed for supplying the heavy phase, while passage 21 is utilized for the removal of the heavy phase.

The letter symbols on the drawing LLI, HLI, LLO, and HLO, respectively, mean light liquid in, heavy liquid in, light liquid out, and heavy liquid out. Arrows have also been applied to indicate the direction of flow.

As is well known in the art, the shaft passages are provided with liquid seals between the rotating shaft 11 and the stationary shaft extensions 15 and 16. In the embodiment of FIGURE 1, there is provided seals 24, 25, 26, and 27. Since the construction of such seals is well known in the art, it is not believed that it will be necessary to further describe them herein.

In accordance with the present invention, rotor 10 is provided internally with a partition means 28 which extends through and divides the working space, the partition, as shown, preferably extending outwardly between shaft 11 and the outer portion of the rotor casing, which, in the embodiment of FIG. 1, is the cylindrical band 10a. Partition means 28 is in the form of a plate which divides the working space into two side-by-side working chambers 29 and 30. The inner end of partition 28 is rigidly connected and sealed to shaft 11 by some suitable means such as welding, as is the outer end of the partition to casing band 10a.

For convenience of reference, the left-hand chamber 29 may be designated as the first working chamber, while the right-hand chamber 30 may be designated as the second working chamber. It will be understood, of course, that these chambers and the respective operational arrangements and functions may be reversed. In accordance with the present invention, the first working chamber, such as the chamber 29, is provided with inlet means for supplying a first liquid phase, which may be either the light phase or the heavy phase, but which in either case contains suspended solid material which it is desired to remove before contacting the first liquid phase with the second liquid phase. In the embodiment of FIGURE 1, the first chamber 29 is provided with inlet means for the light phase which contains solid material. Preferably, the inlet means for supplying the solids-containing liquid phase to chamber 29 communicates with the outer portion of the chamber.

The first chamber, such as the chamber 29, is also provided with opening means in the outer portion of the casing which extends from the outer portion of the first chamber to the exterior of the casing. In the embodiment of FIG. 1, the portion of casing band 10a adjoining the outer portion of chamber 29 is provided with openings 31 which extend through the casing. Preferably, the portion of casing band 10a adjoining the outer portion of chamber 29 extends outwardly, as indicated at 32, to provide an internal recess 33. The solids discharge valve means indicated generally at 34 is mounted in the outer portion of chamber 29 for cooperation with the openings 31 to effect the discharge of solid material separated in the first chamber.

In the illustration given, valve means 34 is hydraulically actuated, and consists of a movable rod 35 having its outer end bottoming against the inner end of openings 31, and its inner end supported on a flexible, fluid-actuated diaphragm 36. A fluid-tight casing 37 is provided to enclose the side of diaphragm 36 adjacent opening 31, and the rod 35 extends through the casing 37 and is slidable with respect thereto. A hollow neck member 38 extends between casing 37 and portion 32 of band 10a. Neck 38 provides mechanical support for valve means 34, and also provides a passage 39 which communicates with a passage 40 in band 10a. Passage 40 is arranged to communicate with other passages (not shown) in end plate 10b, shaft 11, and shaft extension 15, thereby permitting the hydraulic fluid to be supplied under pressure to the chamber provided by valve casing 37 for moving diaphragm 36 and thereby rod 35 to open the solids discharge valve. The hydraulic fluid may be water or other operating liquid. Since the construction and operation of such a valve is well known in the valve art, it is not believed that it will be necessary to further describe it herein.

In accordance with the present invention, partition means 28 is provided with by-pass opening means, such as the passage 41, which has an inlet 41a and an outlet 41b. The by-pass opening means is provided in the partition means for transferring the first phase from chamber 29 after the separation of the solid material therefrom to the second chamber 30. The by-pass opening means communicates with the first chamber 29 at a point inwardly of the outer portion thereof, that is, at a point spaced radially inward from the point of introduction of the phase to the passage 19. As will be seen in FIG. 1, passage 19 has an outlet 19a which communicates with the outer portion of chamber 29 adjacent to, but inwardly of the openings 31 through which the heavy phase is discharged. Preferably, as shown, the opening 19a is just inwardly of the recess 33 within which the solid material can accumulate preparatory to being discharged from the rotor. The outlet 41b from passage 41 preferably communicates with an intermediate portion of chamber 30, but the location of the outlet will vary depending upon whether the by-pass means is designed for transferring the light phase or the heavy phase. In the embodiment of FIG. 1, the by-pass means is for transferring the light phase, and therefore outlet 41b is positioned toward the outside of chamber 30 but spaced inwardly from the outermost portion thereof. More specifically, opening 41b is located to define the outer boundary of the countercurrent contacting section of chamber 30. In the embodiment of FIG. 1, the intermediate portion of the second chamber which provides the countercurrent contacting section is designated by the number 30a, while the outer portion of the chamber which provides the heavy phase clarifying zone is designated 30b. The inner portion of chamber 30 which provides the light phase clarifying zone is designated by the number 30c.

The second chamber, such as the chamber 30, is provided with inlet means for supplying the second liquid phase. In the embodiment of FIG. 1, this inlet means comprises a nozzle 22 which communicates with shaft passage 20, as previously described. Nozzle 22 extends to the intermediate portion 30a of the chamber, and defines the inner boundary of the countercurrent exchange section or zone. It will be understood that the inlet means will be located in radially spaced relation to the outlet from the by-pass means, such as the outlet 41b, thereby providing the countercurrent contacting zone 30a.

A heavy phase outlet means extends from the outer portion 30b of the second chamber. In the illustration given, this consists of the passage 23 which has an inlet 23a. As previously described, passage 23 communicates with shaft passage 21.

The inner portion 30c of the second chamber is provided with light phase outlet means. In the embodiment of FIG. 1, this consists of the passages 17a which communicate with shaft passage 17.

In accordance with prior practice, at least the working chamber 30 is preferably provided with a plurality of radially-spaced contacting elements. More specifically, it is important to provide such contacting elements in the countercurrent or extracting section of the chamber, although it is usually desirable to extend the elements into the clarifying sections. In the contacting sections, the elements promote the repeated mixing and coalescence of the phases to provide a multiple stage extraction, while in the clarifying sections the elements tend to arrest circumferential swirl and to thereby promote clarification.

The elements may be in the form of perforated rings, as described in prior Patents 2,758,783 and 2,758,784. For some purposes, a continuous perforated spiral may also be utilized to provide the axially-spaced partition walls. Variations in the contacting elements which may be employed are described in prior Patents 2,758,783 and 2,840,301, as well as in pending applications Ser. No. 303,792, filed Aug. 22, 1963, now Patent 3,285,508, issued Nov. 15, 1966, and Ser. No. 303,833, filed Aug. 22, 1963, and now abandoned. A variation in the swirl-arresting elements which may be employed in the clarifying sections of the rotor is described in Patent 3,053,440. In the embodiment of FIG. 1, chamber 30 is provided with perforated, axially concentric, radially-spaced rings 42, which extend from the light phase clarifying section 30c, through the contacting section 30a into the heavy phase clarifying section 30b.

The first chamber 29 may also be provided with suitable swirl-arresting elements, which may be in the form of perforated, axially concentric, radially-spaced rings 43. It will be understood that rings 43 are similar in construction and arrangement to the rings 42. Alternatively, chamber 29 may be provided with other swirl-arresting elements, such as those described in Patent 3,053,440.

The ends of the rings 42, 43 may be supported in grooves respectively in end plates 10c or 10b and partition 28, as shown. The construction is illustrated in greater detail in FIG. 2, where the recesses are designated by the number 44. As there shown, the rings 43 are provided with perforations 43a, and the ends of the rings are received within the recesses 44 of end plate 10b. It will be understood that similar recesses are provided in partition 28 and in end plate 10c.

In the design of centrifugal apparatus, it will be understood that the rotor components should be constructed and arranged in accordance with the principle of axial symmetry. This permits the rotor to be diametrically balanced. In the embodiment of FIG. 1, flow passages providing the phase inlet and outlet means and phase transfer means are provided in pairs, but other arrangements are feasible, such as the provision of three of each of the means within the rotor spaced 120° apart, etc. More than one pair of any inlet or outlet means can be provided, and usually at least two pairs of each means will be employed.

Turning to FIGURE 2, there is shown a modification of the apparatus of FIG. 1 which may be employed for removing the solid material from a heavy liquid phase before it is contacted with the light liquid phase. The corresponding parts have been given the same numbers, except that where the elements have been modified, the numbers have been primed. Not all of the components have been renumbered, since they do not require any special discussion with reference to FIG. 3.

In the embodiment of FIGURE 2, shaft passage 18 and passage 19 are employed for supplying a solids-containing heavy phase to the outer portion of the first chamber 29. As the heavy phase moves inwardly through chamber 29, the solid material is thrown outwardly and collects in recess 33 for ejection through openings 31 from the actuation of valve 34.

Partition means 28' is provided with by-pass means 41' which extends between the inner portions of the chambers 29 and 30 at a point spaced radially outwardly from shaft 11. The opening comprising the by-pass 41' is preferably located between contacting section 30a of working chamber 30 and the clarifying section 30c of the chamber, as shown in FIG. 3. In this position, opening 41' communicates with chamber 30 at the inner boundary of the contacting section 30a.

The phase inlet means for chamber 30 comprises the nozzle 22', which communicates with shaft passages 20a and 20. In the embodiment of FIG. 3, nozzles 22' supply the light phase to chamber 30, and therefore terminate at the outer boundary of the contacting section 30a immediately inward of the clarifying section or zone 30c.

The operation of the apparatus of this invention will be readily apparent from the foregoing discussion to those familiar with the operation of similar equipment. The heavy and light phases are pumped into the rotor under pressure and are maintained under pressure therein. The desirable pressure conditions on the inlet and outlet streams will be further illustrated by a specific example. With the apparatus of FIG. 1, the solid material is removed from the light phase in the outer portion of chamber 29, the solid material moving outwardly into recess 30, while the light phase flows inwardly toward the by-pass entrance 41a. Valve 34 is operated at sufficient intervals to discharge the solids, which occurs readily upon the opening of the valve due to the centrifugal force exerted on the solids and the liquid pressure within chamber 29.

The same method of operation applies to the apparatus of FIG. 3, except that the solids are separated from the heavy phase in the chamber 29. The solids-free light or heavy phase is then transferred from chamber 29 to chamber 30 through the by-pass means 41, 41', and subjected to countercurrent contacting for extraction in chamber 30. Upon completion of the contacting or extracting operation, the clarified light and heavy phases are removed from chamber 30, as previously described.

By way of more specific illustration, an apparatus similar to that of FIG. 1 can be used for extraction of catalytic cycle stock with phenol to remove refractory components. The oil stock frequently contains finely divided solid catalyst fines which must be removed prior to the phenol extraction. Unless the catalyst fines are removed prior to the extraction stage, the fines, being solid material, can lodge in the centrifugal extractor and interfere with its operation. With the apparatus of FIG. 1, the catalyst fines would be removed by pre-treatment in chamber 29, and then the phenol extraction would be carried out in chamber 30.

The apparatus of FIG. 3 can be advantageously employed for treating fermentation broths prior to the extraction of antibiotics therefrom. The aqueous extraction broth, which may contain an antibiotic such as penicillin, will also contain fermentation solids, which should be removed prior to the extraction with an organic solvent, such as amyl acetate. The aqueous fermentation broth will usually be the heavy phase, while the organic solvent, such as amyl acetate, will be the light phase. Using an apparatus similar to FIG. 3, the fermentation solids can be removed in chamber 29, and thereafter the extraction can be performed in chamber 30.

While in the foregoing specification this invention has been described in relation to certain preferred embodiments thereof, and many details have been set forth for the purpose of illustration, it will be apparent to those skilled in the art that the invention is susceptible to additional embodiments and that many of the details described herein can be varied considerably without departing from the basic principles of the invention.

I claim:
1. In a centrifugal contacting apparatus for processing a first liquid phase containing suspended solid material from which the solid material is desirably removed prior to contacting with a second substantially immiscible liquid phase of different density, the combination comprising:
  (1) a rotatively mounted shaft providing a plurality of liquid flow passages therein;
  (2) a rotor casing mounted coaxially on said shaft and providing a pressure-retaining working space therein extending outwardly from said shaft;
  (3) partition means mounted within said rotor casing to extend outwardly between said shaft and the outer portion of said casing, said partition means dividing said working space into two side-by-side chambers comprising first and second chambers;
  (4) inlet means for supplying said first liquid phase to the first one of said chambers from the first one of said shaft passages;
  (5) opening means provided in the outer portion of said casing and extending from the outer portion of said first chamber to the exterior of said casing;
  (6) solids discharge valve means mounted in the outer portion of the first chamber for cooperation with said opening means to effect the discharge of the solid material separated in said first chamber;
  (7) by-pass opening means provided in said partition means for transferring said first phase after the separation of the solid material therefrom to said second chamber, said by-pass opening means communicating with said first chamber at a point inwardly of the outer portion thereof;
  (8) inlet means for supplying said second phase to said second chamber from a second one of said shaft passages, the inlet from said inlet means being located in radially-spaced relation in said second chamber with respect to the inlet thereto from said by-pass means to provide a countercurrent contacting zone between said inlets;
  (9) a heavy phase outlet means extending from the outer portion of said second chamber to a third one of said shaft passages; and
  (10) light phase outlet means extending from the inner portion of said second chamber to a fourth one of said shaft passages.

2. The centrifugal contacting apparatus of claim 1 in which said solids-containing first phase is the lighter phase and said second phase is the heavier phase, said by-pass means communicating with the inner portion of said first chamber and extending outwardly to the outer boundary of said second chamber countercurrent contacting zone, and said second chamber inlet means supplying the heavier phase to the inner boundary of said contacting zone.

3. The centrifugal contacting apparatus of claim 1 wherein said solids-containing first phase is the heavier phase and said second phase is the lighter phase, said by-pass means extending between said first and second chambers at a point corresponding to the inner boundary of said second chamber countercurrent contacting zone, said second chamber inlet means supplying the light phase to the outer boundary of said countercurrent contacting zone.

4. The centrifugal contacting apparatus of claim 1 in which said second chamber contains a plurality of radially-spaced contacting elements, and in which said first chamber contains a plurality of radially-spaced, swirl-arresting elements.

5. In a centrifugal contacting apparatus for processing a first liquid phase containing suspended solid material from which the solid material is desirably removed prior to contacting with a second substantially immiscible liquid phase of different density, the combination comprising:
  (1) a rotatively mounted shaft providing a plurality of liquid flow passages therein;
  (2) a rotor casing mounted coaxially on said shaft and providing a pressure-retaining working space therein extending outwardly from said shaft;
  (3) partition means mounted within said rotor casing to extend outwardly between said shaft and the outer portion of said casing, said partition means dividing said working space into two side-by-side chambers comprising first and second chambers;
  (4) inlet means for supplying said first liquid phase to the outer portion of the first one of said chambers from a first one of said shaft passages;
  (5) opening means provided in the outer portion of said casing and extending from the outer portion of said first chamber to the exterior of said casing;
  (6) solids discharge valve means mounted on said casing in the outer portion of the first chamber for cooperation with said opening means to effect the discharge of the solid material separated in said first chamber;
  (7) by-pass opening means provided in said partition means for transferring said first phase after the separation of the solid material therefrom to an intermediate portion of said second chamber, said by-pass opening means communicating with said first chamber at a point inwardly of the outer portion thereof;
  (8) inlet means for supplying said second phase to an intermediate portion of said second chamber from a second one of said shaft passages, the inlet from said inlet means being located in radially-spaced relation in said second chamber with respect to the inlet thereto from said by-pass means to provide a countercurrent contacting zone in said intermediate portion of said second chamber;
  (9) a heavy phase outlet means extending from the outer portion of said second chamber to a third one of said shaft passages; and
  (10) light phase outlet means extending from the inner portion of said second chamber to a fourth one of said shaft passages.

6. The centrifugal contacting apparatus of claim 5 in which said solids-containing first phase is the lighter phase and said second phase is the heavier phase, said by-pass means communicating with the inner portion of said first chamber and extending outwardly to the outer boundary of said second chamber countercurrent contacting zone, and said second chamber inlet means supplying the heavier phase to the inner boundary of said contacting zone.

7. The centrifugal contacting apparatus of claim 5 wherein said solids-containing first phase is the heavier phase and said second phase is the lighter phase, said bypass means extending between said first and second chambers at a point corresponding to the inner boundary of said second chamber countercurrent contacting zone, said second chamber inlet means supplying the light phase to the outer boundary of said countercurrent contacting zone.

8. The centrifugal contacting apparatus of claim 5 in which both said first and second chambers are provided with a plurality of radially-spaced, perforated rings.

References Cited

UNITED STATES PATENTS

| | | | |
|---|---|---|---|
| 2,286,354 | 6/1942 | Fitzsimmons | 233—20 |
| 2,422,882 | 6/1947 | Bramley | 233—18 X |
| 2,867,582 | 1/1959 | Shuman et al. | |
| 3,116,246 | 12/1963 | Podbielniak | 233—15 |

M. CARY NELSON, *Primary Examiner.*

HENRY T. KLINKSIEK, *Examiner.*